(12) United States Patent
Furusawa et al.

(10) Patent No.: US 7,241,400 B2
(45) Date of Patent: Jul. 10, 2007

(54) PHOSPHOR

(75) Inventors: Naoko Furusawa, Ilino (JP); Satoshi Ito, Hino (JP); Hisatake Okada, Ilino (JP); Hideki Hoshino, Hino (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

(21) Appl. No.: 10/794,536

(22) Filed: Mar. 5, 2004

(65) Prior Publication Data

US 2004/0178389 A1 Sep. 16, 2004

(30) Foreign Application Priority Data

Mar. 11, 2003 (JP) .............................. 2003-064646

(51) Int. Cl.
C09K 11/59 (2006.01)
C09K 11/54 (2006.01)

(52) U.S. Cl. .............................................. 252/301.6 F

(58) Field of Classification Search ......... 252/301.4 R, 252/301.6 F
See application file for complete search history.

(56) References Cited

U.S. PATENT DOCUMENTS 4,440,831 A * 4/1984 Brownlow et al. ......... 428/404
5,413,736 A * 5/1995 Nishisu et al. .......... 252/301.4 R
6,692,660 B2 * 2/2004 Kumar ................. 252/301.4 R
6,712,993 B2 * 3/2004 Kijima et al. .......... 252/301.4 R
6,716,524 B2 * 4/2004 Wataya et al. ............... 428/402
7,001,537 B2 * 2/2006 Kijima et al. .......... 252/301.4 R

FOREIGN PATENT DOCUMENTS

| JP | 01-272689 A | 10/1989 |
| JP | 2002-50288 | 2/2002 |
| JP | 2002-226853 | * 8/2002 |
| JP | PCT/JP04/002764 | 3/2006 |

OTHER PUBLICATIONS

Japanese Publ. No. 2003-500515.
Japanese Publ. No. 2003-55654.
Japanese Publ. No. 2002-226844.
Japanese Publ. No. 2002-19437.
Japanese Publ. No. 2001-329262.

* cited by examiner

*Primary Examiner*—C. Melissa Koslow
(74) *Attorney, Agent, or Firm*—Lucas & Mercanti, LLP

(57) ABSTRACT

A phosphor includes particles having an average particle size of from 10 nm to 2 μm, wherein 90% by mass or more of all of the particles have particle sizes within ±30% of the average particle size and a ratio of particles having no corners to all of the particles is 80% or more in number.

7 Claims, 3 Drawing Sheets

LEFT ← → RIGHT

DOWN

PHOSPHOR

BACKGROUND OF THE INVENTION

1. Field of the Invention

The present invention relates to a phosphor suitable for a phosphor layer of a plasma display panel.

2. Description of Related Art

A plasma display panel (hereinafter abbreviated as PDP) comprises two sheets of glass substrates having provided thereon electrodes, and a number of minute discharge spaces (hereinafter referred to as a cell) formed by partition walls provided between the substrates. On side surfaces of the partition walls surrounding each cell and the bottom surface of each cell, phosphor layers each emitting red (R), green (G) and blue (B) light are provided, and a discharge gas mainly composed of Xe, Ne, etc. is enclosed within the cell. When a voltage is applied between the electrodes for selective discharge, ultraviolet rays are generated and the phosphor is excited to emit light, whereby desired information can be displayed.

In general, a phosphor layer is formed using $(Y, Gd)BO_3$:Eu (red), $Zn_2SiO_4$:Mn (green), $BaMgAl_{10}O_{17}$:Eu (blue), etc. (see, e.g., Japanese Patent Application Publication-Tokukai-2002-226853 and Japanese Patent Application Publication-Tokuhyou-2001-513828) The phosphor layer is formed by coating a phosphor paste containing a phosphor within the partition walls of a panel using, for example, an ink jet nozzle, drying the coated phosphor paste and then calcining the dried phosphor paste (see, e.g., Japanese Patent Application Publication-Tokukai-2002-50288). With a recent tendency toward miniaturization of a discharge cell and complexity of a shape in the discharge cell, the coating of the phosphor paste using such an ink jet printing has been employed as an extremely effective method.

However, an ink jet nozzle used at the coating of phosphors has a nozzle size of from 50 μm to 100 μm and therefore, there is a problem that unless phosphors having an extremely small particle size and a uniform particle shape are used, clogging of the nozzle is easily caused. Further, there is a possibility that deterioration in luminance performance, and rapid deterioration in heat treatment resistance in a baking step after the coating of phosphor pastes, or in ultraviolet ray resistance at the discharge are caused if phosphor particles are only made fine.

SUMMARY OF THE INVENTION

An object of the present invention is to provide a phosphor having higher luminance, shorter afterglow, excellent heat treatment resistance and excellent ultraviolet ray resistance.

In order to attain the above-described object, in accordance with the first aspect of the invention, a phosphor comprises particles having an average particle size of from 10 nm to 2 μm, wherein 90% by mass or more of all of the particles have particle sizes within ±30% of the average particle size and a ratio of particles having no corners to all of the particles is 80% or more in number.

According to the first aspect of the invention, the phosphor is an extremely fine particle having an average particle size of from 10 nm to 2 μm, the phosphor has such an extremely narrow particle size distribution that 90% by mass or more of all the particles have a particle size within ±30% of the average particle size and the ratio of particles having no corners to all the particles is 80% or more in number, whereby clogging of a nozzle can be prevented at the ejection of phosphor pastes using an ink jet nozzle, which leads to smooth ejection of the phosphor pastes. Further, the phosphor layer can be densely filled with the phosphor particles, which leads to improvement in emission intensity of PDP. In addition, the particles have a uniform particle size and therefore, uniform and beautiful emission can be performed.

The phosphor particles are a particle having no corners and therefore, in a dispersion step at the preparation of the phosphor paste, a mechanical damage such as "chip" can be prevented and formation of lattice defects, etc. due to application of stress on the phosphor, which causes decrease in emission efficiency, can be prevented. Further, heat treatment resistance in a baking step at the preparation of a phosphor layer or ultraviolet ray resistance at discharge within a discharge cell can be improved. In addition, the phosphor particle is a particle having no corners and therefore, ejection of phosphor pastes using the ink jet nozzle can be more smoothly performed.

Herein, reasons why three parameters of small particle size, particle size distribution and shape in the present invention become necessary conditions are described item by item.

First, as to emission intensity, when both of the particle size distribution and the shape are not within the above-described range, the emission intensity will be lowered. It is considered that this is because an activator, for example, manganese is uniformly distributed among particles.

As to ejection of phosphor pastes in an ink jet nozzle, when the above-described three parameters of small particle size, narrow particle size distribution and shape having no corners are met, ejection failure is improved. Further, even when the particle size is small and the shape has no corners, ejection failure occurs due to a broad particle size distribution. In addition, even when the particle size is small and the particle size distribution is narrow, ejection failure occurs as long as the shape is changeable.

Furthermore, in order to improve heat treatment resistance in a baking step of the phosphor paste, a narrow particle size distribution and a shape having no corners are demanded. This is because when either of two parameters of the particle size distribution and the shape deviates from the scope of the present invention, the heat treatment resistance is deteriorated. When two parameter conditions of the particle size distribution and the shape are satisfied, the heat treatment resistance will be more improved as the particle size becomes larger.

As to the panel luminance of a PDP, when three parameter conditions of small particle size, narrow particle size distribution and shape having no corners are satisfied, the highest panel luminance can be obtained. Accordingly, when either of two parameters of the particle size distribution and the shape does not satisfy the conditions of the present invention, the panel luminance is lowered. Further, when the particle size exceeds 500 nm, the panel luminance is lowered and the luminance level is maintained when the particle size is in the range of from 500 nm to 2 μm. However, when the particle size is 2 μm or more, the panel luminance is rapidly lowered. It is considered that this is because when the particle has a particle size of from 500 nm to 2 μm and satisfies two parameter conditions of the particle size distribution and the shape, positive effects that the heat treatment resistance is improved and negative effects that the filling factor is reduced are cancelled, whereby the panel luminance is maintained.

From the above-described viewpoints, when the three parameter conditions of small particle size, particle size distribution and shape are met, the effects of the present invention can be exerted to the full.

In particular, when the average particle size of the phosphor is made to 10 nm to 500 nm, it is possible to obtain a more advantageous effect on prevention of nozzle clogging and ejection of phosphor pastes. Further, the emission intensity of the PDP can be improved noticeably. Thus, this case is preferable.

Furthermore, in the above phosphor, it is preferable that the particle having no corners is a spherical particle or a particle obtained by fusing a plurality of spherical particles. Specifically, since 80% or more in number of all the phosphor particles are a spherical particle or a particle where a plurality of spherical particles are fused, the particle has a small surface area as compared with a particle having many corners, so that agglomeration of particles can be prevented, which leads to prevention of clogging of a nozzle.

Further, when the above phosphor is $Zn_2SiO_4:Mn^{2+}$, a green-emitting phosphor suitable for a phosphor layer of PDPs is obtained.

Further, the phosphor may be formed by using colloidal silica. In the phosphor, it is particularly preferable to synthesize a precursor of the $Zn_2SiO_4:Mn^{2+}$ phosphor by using colloidal silica. Thereby, particles are stably dispersed in a solution due to a minus charge of a silanol group on a surface of the colloidal silica and therefore, this silanol group reacts with the other constituent elements (zinc or manganese) to form zinc hydroxide or manganese hydroxide, as a result, a precursor having a uniform composition is obtained. Thus, a phosphor having a small particle size, a narrow particle size distribution and a shape having no corners within the scope of the present invention can be obtained.

Further, when the phosphor is $BaMgAl_{10}O_{17}:Eu^{2+}$, a blue-emitting phosphor suitable for a phosphor layer of PDPs is obtained. Further, when the phosphor is $(Y,Gd)BO_3:Eu^{3+}$, a red-emitting phosphor suitable for a phosphor layer of PDPs is obtained.

Further, the above phosphor is preferable because a precursor of the phosphor is spherical, whereby the phosphor is also made to have a spherical shape or a shape having no corners, in which a plurality of spherical precursor particles are fused.

Further, the phosphor may be synthesized by a liquid phase process. Because the precursor of the phosphor is synthesized by a liquid phase process, a phosphor having high purity can be obtained stoichiometrically and the particle size can be easily controlled as compared with a precursor synthesized by a solid phase process.

Further, it is preferable to form a precursor of the phosphor by using a precipitation process. Thereby, a phosphor having a small particle size, a narrow particle size distribution and a shape having no corners within the scope of the present invention can be obtained.

Further, it is preferable to synthesize the precursor by the liquid phase process in the presence of a protective colloid. Thereby, agglomeration of the precursor particles is prevented. Further, it is possible to obtain a spherical precursor having a smaller particle size and a narrow particle size distribution. A phosphor obtained by calcining the precursor also has a smaller particle size, a narrow particle size distribution and a uniform shape having no corners. Therefore, the emission intensity, heat treatment resistance and ultraviolet ray resistance can be improved.

In accordance with the second aspect of the invention, a method for producing the above phosphor, comprises synthesizing a precursor of the phosphor by the liquid phase process.

According to the second aspect of the invention, because a precursor of the phosphor is synthesized by the liquid phase process, it is possible to control the particle sizes and the shape and to obtain the above phosphor.

In the method, the precursor maybe synthesized by the liquid phase process in the presence of a protective colloid.

Because the precursor is synthesized by the liquid phase process in the presence of a protective colloid, agglomeration of the precursor particles is prevented. Further, it is possible to prepare a spherical precursor having a smaller particle size and a narrow particle size distribution, and to increase the ratio of particles having no corners. The emission intensity of the phosphor, the heat treatment resistance at the forming of the phosphor layer of the PDP and the ultraviolet ray resistance at discharge within a discharge cell of the PDP can be improved.

In accordance with the third aspect of the invention, a phosphor paste for forming a phosphor layer of a plasma display panel, comprises the above-described phosphor. Thereby, even when the phosphor paste is coated using an ink jet nozzle, on partition walls constructing a discharge cell of PDP, clogging of the nozzle is not caused, which results in good workability. The phosphor is excellent in heat treatment resistance, so that occurrence of peeling, etc. can be prevented in the baking step after coating the phosphor paste at the preparation of PDP and therefore, reduction of emission intensity after the baking can also be prevented. Further, the phosphor is excellent in ultraviolet ray resistance, so that the PDP can undergo a long use.

In accordance with the fourth aspect of the invention, the plasma display panel comprises a phosphor layer containing the above-described phosphor. Thereby, emission intensity of the cell, that is, emission intensity of the PDP can be improved.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

DETAILED DESCRIPTION OF THE INVENTION

Embodiments of the present invention are described below.

First, the phosphor according to the present invention is described. The phosphor according to the present invention comprises particles having an average particle size of from 10 nm to 2 µm, wherein 90% by mass or more of all of the particles have particle sizes within ±30% of the average particle size and a ratio of particles having no corners to all of the particles is 80% or more in number.

The "average particle size" used herein means an average value obtained by measuring the average particle size of 300 phosphor particles using an electron microscope (e.g., S-900, etc., manufactured by Hitachi, Ltd.). Further, when the phosphor particle is spherical, the "particle size" used herein means a diameter of the particle, and when the phosphor particle exhibits a shape where a plurality of spherical particles are fused, it means a diameter of a sphere having a volume equivalent to that of the phosphor particle (a sphere equivalent diameter).

When the average particle size is from 10 nm to 2 μm, clogging of a nozzle can be prevented at the ejection of phosphor pastes using an ink jet nozzle, which leads to smooth ejection of the phosphor pastes. When the average particle size is 500 nm or less, and further, 400 nm or less, the phosphor pastes can be more smoothly ejected.

"90% by mass or more of all the phosphor particles have particle sizes within ±30% of the average particle size" means that the phosphor particles have a narrow particle size distribution and all the phosphor particles have almost the same particle size. It is more preferred that 90% by mass or more of all the particles have a particle size within ±20% of the average particle size.

When 90% by mass or more of all the particles have particle sizes within ±30%, further a particle size within ±20% of the average particle size, the phosphor layer can be densely filled with the phosphor particles, which leads to improvement in emission intensity of the PDP. In addition, when the particles have a uniform particle size, uniform and beautiful emission can be performed.

Next, "a particle having no corner" means a particle of which the surface comprises a smooth curve or a particle obtained by fusing a plurality of these particles. Further, it means a spherical particle or a particle where a plurality of the spherical particles are fused.

The phosphor according to the present invention is one obtained by calcining uniform-sized spherical precursors with a particle size of 2 μm or less, more preferably 500 nm or less synthesized by the liquid phase process as described later, and has a shape after the calcination being almost the same as that of the precursor or a shape where a plurality of the precursor particles are fused to each other. Accordingly, a particle phosphor "having no corner" is defined so that assuming that the diameter of a spherical precursor is L, when a circle having a diameter of L/2 is rotated along the inside of the particle toward all the directions while internally touching one point on the circumferential line of the phosphor particle, this circle does not substantially project outside the phosphor. "The circle does not substantially project" used herein means a case where two or less projections are present in the circle. When the precursor is not spherical, a sphere equivalent diameter is set at L.

When the phosphor particle is a particle having no corner, in a dispersion step at the preparation of the phosphor paste, a mechanical damage such as "chip" can be prevented and formation of lattice defects, etc. due to application of stress on the phosphor, which causes decrease in emission efficiency, can be prevented. Further, heat treatment resistance in a baking step at the preparation of a phosphor layer or ultraviolet ray resistance at discharge within a discharge cell can be improved. The dispersion step and the baking step are described later.

When the phosphor particle has the particle size distribution falling within ±30% of the average particle size, effects for the heat treatment resistance or the ultraviolet ray resistance are exerted. When the ratio of particles having no corner to all the particles becomes 80% or more in number, the effects become obvious, while when it becomes 90% or more, the effects become remarkable. When the ratio of particles having no corner becomes less than 80% or the particle size distribution is in excess of 30%, the effects are hardly exerted. That is, in order to obtain high heat treatment resistance and ultraviolet ray resistance, it is important to simultaneously satisfy such conditions that the phosphor particle has a shape having no corner, the ratio of particles having no corner to all the particles is 80% or more in number and the particle size distribution is within 30%.

Further, when the phosphor particle is a particle having no corner, ejection of phosphor pastes using the ink jet nozzle can be more smoothly performed.

The phosphor according to the present invention is not particularly limited on a composition thereof, and publicly known various compositions can be applied thereto. Preferred are inorganic oxide phosphors and inorganic halide phosphors. Specific compounds of the phosphors for use in the present invention are described below at every emission color, however, the present invention is not limited thereto.

[Blue Light-emissive Phosphor Compound]
(BL-1): $Sr_2P_2O_7:Sn^{4+}$
(BL-2): $Sr_4Al_{14}O_{25}:Eu^{2+}$
(BL-3): $BaMgAl_{10}O_{17}:Eu^{2+}$
(BL-4): $SrGa_2S_4:Ce^{3+}$
(BL-5): $CaGa_2S_4:Ce^{3+}$
(BL-6): $(Ba, Sr)(Mg, Mn)Al_{1017}:Eu^{2+}$
(BL-7): $(Sr, Ca, Ba, Mg)_{10}(PO_4)6Cl_2:Eu^{2+}$
(BL-8): $ZnS:Ag$
(BL-9): $CaWO_4$
(BL-10): $Y_2SiO_5:Ce$
(BL-11): $ZnS:Ag, Ga, Cl$
(BL-12): $Ca_2B_5O_9Cl:Eu^{2+}$
(BL-13): $BaMgAl_{14}O_{23}:Eu^{2+}$
(BL-14): $BaMgAl_{10}O_{17}:Eu^{2+}, Tb^{3+}, Sm^{2+}$
(BL-15): $BaMgAl_{14}O_{23}:Sm^{2+}$
(BL-16): $Ba_2Mg_2Al_{12}O_{22}:Eu^{2+}$
(BL-17): $Ba_2Mg_4Al_8O_{18}:Eu^{2+}$
(BL-18): $Ba_3Mg_5Al_{18}O_{35}:Eu^{2+}$
(BL-19): $(Ba, Sr, Ca)(Mg, Zn, Mn)Al_{10}O_{17}:Eu^{2+}$

[Green Light-emissive phosphor Compound]
(GL-1): $(Ba, Mg)Al_{16}O_{27}:Eu^{2+}, Mn^{2+}$
(GL-2): $Sr_4Al_{14}O_{25}:Eu^{2+}$
(GL-3): $(Sr, Ba)Al_2Si_2O_8:Eu^{2+}$
(GL-4): $(Ba, Mg)_2SiO_4:Eu^{2+}$
(GL-5): $Y_2SiO_5:Ce^{3+}, Tb^{3+}$
(GL-6): $Sr_2P_2O_7-Sr_2B_2O_5:Eu^{2+}$
(GL-7): $(Ba, Ca, Mg)_5(PO_4)_3Cl:Eu^{2+}$
(GL-8): $Sr_2Si_3O_8-2SrCl_2:Eu^{2+}$
(GL-9): $Zr_2SiO_4, MgAl_{11}O_{19}:Ce^{3+}, Tb^{3+}$
(GL-10): $Ba_2SiO_4:Eu^{2+}$
(GL-11): $ZnS:Cu,Al$
(GL-12): $(Zn, Cd)S:Cu,Al$
(GL-13): $ZnS:Cu, Au, Al$
(GL-14): $Zn_2SiO_4:Mn$
(GL-15): $ZnS:Ag, Cu$
(GL-16): $(Zn, Cd)S:Cu$
(GL-17): $ZnS:Cu$
(GL-18): $Gd_2O_2S:Tb$
(GL-19): $La_2O_2S:Tb$
(GL-20): $Y_2SiO_5:Ce,Tb$
(GL-21): $Zn_2GeO_4:Mn$
(GL-22): $CeMgAl_{11}O_{19}:Tb$
(GL-23): $SrGa_2S_4:Eu^{2+}$
(GL-24): $ZnS:Cu, Co$
(GL-25): $MgO.nB_2O_3:Ce,Tb$
(GL-26): $LaOBr:Tb,Tm$
(GL-27): $La_2O_2S:Tb$
(GL-28): $SrGa_2S_4:Eu^{2+}, Tb^{3+}, Sm^{2+}$

[Red Light-emissive Phosphor Compound]
(RL-1): $Y_2O_2S:Eu^{3+}$
(RL-2): $(Ba, Mg)_2SiO_4:Eu^{3+}$
(RL-3): $Ca_2Y_8(SiO_4)_6O_2:Eu^{3+}$
(RL-4): $LiY_9(SiO_4)_6O_2:Eu^{3+}$
(RL-5): $(Ba, Mg)Al_{16}O_{27}:Eu^{3+}$
(RL-6): $(Ba, Ca, Mg)_5(PO_4)_3Cl:Eu^{3+}$
(RL-7): $YVO_4:Eu^{3+}$
(RL-8): $YVO_4:Eu^{3+, Bi3+}$
(RL-9): $CaS:Eu^{3+}$
(RL-10): $Y_2O_3:Eu^{3+}$
(RL-11): $3.5MgO, 0.5MgF_2GeO_2:Mn$
(RL-12): $YAlO_3:Eu^{3+}$
(RL-13): $YBO_3:Eu^{3+}$
(RL-14): $(Y, Gd)BO_3:Eu^{3+}$ Among the compounds exemplified above, as phosphors for use in the phosphor layer of the PDP, rare earth borate phosphors, silicate phosphors and aluminate phosphors are more preferred. Exemplified $BaMgAl_{10}O_{17}:Eu^{2+}$(BL-3), $Zn_2SiO_4:Mn$(GL-14) and $(Y, Gd)BO_3:Eu^{3+}$(RL-14) are particularly preferred.

The phosphor according to the present invention is obtained by a production method comprising a precursor formation step of forming a precursor of phosphors, a calcination step of calcining the precursor obtained through the precursor formation step, etc. Particularly, in the precursor formation step, it is preferable to synthesize the precursor by a liquid phase process (also referred to as a "liquid phase synthesis process").

The liquid phase process is a process for obtaining the phosphor by preparing the phosphor precursor in the presence of a liquid or in a liquid. In the liquid phase process, since phosphor materials are reacted in the liquid phase, the reaction is performed among element ions constructing the phosphor, so that phosphors having high purity can be easily obtained stoichiometrically. Further, as compared with a solid phase process for producing phosphors while repeating a reaction between solid phases and a pulverization process, a particle having a minute particle size can be obtained without performing the pulverization step, so that formation of lattice defects in a crystal due to a stress applied during the pulverization can be prevented, as a result, the reduction of the emission efficiency can be prevented.

In the present invention, all of the crystallization methods and the coprecipitation methods including a conventionally known cooling crystallization method can be used as the liquid phase process. In particular, a phosphor prepared employing a precursor synthesized by a precipitation process is preferable in terms of the luminance and the distribution. For example, as to a red-emitting phosphor (Y, Gd)$BO_3:Eu^{3+}$ and a blue-emitting phosphor ($BaMgAl_{10}O_{17}$: $Eu^{2+}$) commonly employed in the PDPs, it is particularly preferable to form a phosphor precursor by a precipitation process in the presence of a protective colloid described later. Further, as to a green-emitting phosphor ($Zn_2SiO_4$: $Mn^{2+}$), it is preferable to use the coprecipitation methods among the precipitation process. Further, among these, it is preferable to use a method (hereinafter referred to as a "silica nucleus method") that a silicide such as silica is employed as a mother nucleus of the phosphor precursor and the other element constructing the phosphor is precipitated around the nucleus in a liquid phase.

The precipitation process is described below.

The precipitation process is a method for preparing phosphor precursors by mixing in the liquid phase a solution containing elements as phosphor materials, utilizing a crystallization phenomenon. The crystallization phenomenon means a phenomenon where a solid phase is precipitated from the liquid phase when changes are brought in a state of mixture system by physical or chemical environmental changes due to cooling, evaporation, pH adjustment, concentration, etc. or by chemical reactions. The production method of phosphor precursors by the precipitation process in the present invention means a production method by a physical or chemical operation which may cause occurrence of the crystallization phenomenon as described above.

As a solvent used in the application of the precipitation process, any solvent may be used as long as reaction materials are dissolved, however, water is preferable in view of ease of control over the degree of supersaturation. In the case of using a plurality of reaction materials, the materials may be added simultaneously or separately, and a suitable addition order can be appropriately set up according to activities.

Next, the silica nucleus method is described.

For forming a precursor by the silica nucleus method employing the silicon-based materials such as silica as a mother nucleus of the phosphor crystal, a silicon-based liquid substance prepared by dispersing silicon-based materials in a liquid is mixed with a liquid substance prepared by dissolving a metal element in a liquid in a state of a positive ion or a metal-based liquid substance prepared by dispersing a metal element as a solid in a liquid.

In the silica nucleus method, silicon dioxide (silica) is particularly preferably usable as a silicon-based material. As silicon dioxide, for example, fumed silica, wet-process silica, colloidal silica, etc. can be used. When using the colloidal silica, particularly preferred is an anionic one.

For producing the precursor of ($Zn_2SiO_4:Mn^{2+}$) phosphor as a green-emitting phosphor, colloidal silica is most preferably used. This case is characterized in that particles are stably dispersed in a solution due to a minus charge of a silanol group on a surface of the colloidal silica. Therefore, this silanol group reacts with the other constituent elements to form zinc hydroxide or manganese hydroxide, as a result, a precursor obtained has higher uniformity. Thus, a phosphor having a narrow particle size distribution and a shape with no corners can be obtained.

On the other hand, in the case of using the fumed silica, silica particles tend to agglomerate each other when dispersed in purified water, as a result, the particles are scarcely mixed uniformly with zinc hydroxide or manganese hydroxide. Thus, a phosphor having the particle size distribution and shape within the scope of the present invention cannot be obtained.

Further, a primary particle size or secondary aggregate particle size of the silicon-based materials in the present invention is preferably 1 μm or less, more preferably 0.5 μm or less, still more preferably 0.1 μm or less, further preferably 0.01 μm or less. When the primary particle size or secondary aggregate particle size of the silicon-based materials is controlled, an average particle size of the silicate phosphors after calcination can be made to a desired size.

In particular, also in the case of using the above-described colloidal silica, the primary particle size or secondary aggregate particle size is preferably 0.1 μm or less, more preferably 0.1 μm or less, similarly to the above-described case. The use of the colloidal silica having the primary particle size or secondary aggregate particle size of 0.1 μm or less is preferred in that more minute phosphors can be obtained.

Incidentally, the primary particle size means a particle size of one crystal defined as a primary particle. Further, the secondary aggregate particle size means a particle size of the secondary aggregate particle formed by the agglomeration of primary particles of silicon-based materials in a liquid.

As a liquid for dispersing silicon-based materials, any liquid may be used as long as the silicon-based materials are not substantially dissolved. Water or alcohols or a mixture thereof may be preferably used. As alcohols, any alcohols may be used as long as the silicon-based materials are dispersed therein, and examples thereof include methanol, ethanol, isopropanol, propanol and butanol. Among these, preferred is ethanol in which the silicon-based materials relatively tend to be dispersed therein.

Herein, "the silicon-based materials are not substantially dissolved" means that solubility of silicon-based materials in a liquid is in the range of 0.1% or less.

A dispersion state of silicon-based materials in a liquid or the secondary aggregate particle size is desirable to be previously adjusted to make a desired state.

Further, in the case of using the colloidal silica described above, the particle size and dispersion state in a liquid is previously adjusted, therefore, a suitable one may be appropriately used.

As described above, when the silicon-based liquid substance is previously adjusted or colloidal silica is used, the dispersion state of silicon-based materials in a liquid is made preferable, therefore, the secondary aggregate particle size, etc. become constant.

Next, the metal-based liquid substance is described.

As a liquid for dissolving or dispersing a metal element, any liquid may be used as long as silicon-based materials are not substantially dissolved. Water or alcohols or a mixture thereof may be preferable, similarly to the above-described case. Examples of alcohols include methanol, ethanol, isopropanol, propanol, butanol, etc. In particular, ethanol is preferable.

In the silica nucleus method described above, a solution containing a precipitant reacting with a metal element to form a precipitate may be mixed at the mixing of the silicon-based liquid substance and the metal-based liquid substance.

Herein, the solution containing a precipitant means one prepared by dissolving the precipitant described later in water or alcohols or a mixture thereof. Specific examples of the alcohols include methanol, ethanol, isopropanol, propanol, butanol, etc. Any alcohols may be used as long as the silicon-based materials are dispersed therein.

As a precipitant, an organic acid or an alkali hydroxide can be preferably used. The organic acid or the alkali hydroxide reacts with a metal element to form an organic acid salt or a hydroxide as a precipitate. At this time, these precipitates are preferably precipitated around the silicon-based materials as a mother nucleus.

Further, as the amount of the precipitant used, preferred are one time or more stoichiometric quantities demanded to precipitate the metal element as a precipitate such as organic acid salts or hydroxides.

As an organic acid, one having a carboxylic acid group (—COOH) is preferable, and specific examples thereof include an oxalic acid, formic acid, acetic acid, tartaric acid, etc. In addition, employed may be one generating an oxalic acid, formic acid, acetic acid, tartaric acid, etc. by hydrolysis, etc.

As an alkali hydroxide, any hydroxide may be used as long as it has a hydroxide group (—OH), or it reacts with water to generate a hydroxide group or it generates a hydroxide group by hydrolysis. Examples of the alkali hydroxide include ammonia, sodium hydroxide, potassium hydroxide, urea, etc. Among these, ammonia is preferably used.

Further, in the formation of phosphor precursors, a preferred embodiment for producing finer phosphors having a narrower particle size distribution is to add two or more of phosphor material solutions into a poor solvent in the presence of a protective colloid, including the above-described silica nucleus method or precipitation process. Further, more preferable embodiment is to adjust various physical property values such as addition speed, addition position, stirring conditions and pH according to types of phosphors. Further, one of preferred embodiments is to optionally concentrate and/or mature the liquid after completing the addition of raw materials.

As a protective colloid, various high molecular compounds can be used regardless of natural one or artificial one. Among these, protein can be preferably used.

Examples of the proteins include gelatin, water-soluble protein and water-soluble sugar protein. Specific examples thereof include albumin, egg albumin, casein, soy protein, synthetic protein, genetically engineered protein, etc.

Examples of the gelatin include lime-treated gelatin or acid treated gelatin. These maybe used in combination. Further, hydrolyzates of these gelatins or enzymic hydrolyzates of these gelatins may be used.

The protective colloid is not necessarily a single composition and various binders may be mixed therein. Specifically, for example, a graft-polymer of the gelatin and another polymer can be used.

An average molecular weight of the protective colloid is preferably 10,000 or more, more preferably from 10,000 to 300,000, particularly preferably from 10,000 to 30,000.

The protective colloid can be added into one or more material solutions. It may be added into all the material solutions. The particle size of precursors can be controlled according to the addition amount of the protective colloid or the addition speed of a reactive solution.

When the phosphor precursors are formed in the presence of the protective colloid, agglomeration of the phosphor precursors can be prevented. Further, the shape thereof can be made to be spherical and the phosphor precursors can be sufficiently made smaller. As a result, various characteristics of phosphors can be improved such that the phosphors after calcination are made finer, made narrower in particle size distribution and improved in emission properties. When performing the reaction in the presence of protective colloids, sufficient consideration must be given to the control of the particle size distribution of phosphor precursors or the removal of impurities such as ions which remain in the solution regardless of the reactions.

Herein, there are explained examples for producing a monodisperse particle having no corners, which is a fine phosphor particle having an average particle size in the above-described range as in the present invention, employing the silica nucleus method. For example, in the case of using no protective colloid, a silanol group on a surface of silica particles is reacted with a zinc ion ($Zn^{2+}$) or a manganese ion ($Mn^{2+}$) to precipitate zinc hydroxide or manganese hydroxide and then the precipitated zinc hydroxide or manganese hydroxide is grown on the surface of the silica particles. On the other hand, in the case of using the protective colloid, after producing a precursor of a monodisperse particle having no corners by employing fine particles of zinc hydroxide or manganese hydroxide, colloidal silica may be added to the precursor solution.

When colloidal silica is used as the silicon material in this case, the silanol group on the silica surface bonds to the $Zn^{2+}$ ion on the surface of the precursor and thereby, an effect is provided that zinc hydroxide and silica particles are uniformly mixed. As a result, there can be obtained a phosphor which is preferable in terms of the particle size, the particle size distribution and the shape as in the present invention.

At the precipitation of the hydroxide, it is preferable to use an addition method capable of shortening an average mixing time, for example, a double jet method. The double jet method is a method for simultaneously adding two kinds of reactive solutions to a mother liquor by use of separate nozzles. In the present invention, this method corresponds to a method of simultaneously adding, as a reactive solution, a zinc ionic solution or a manganese ionic solution and an ammonia solution to an aqueous gelatin solution as the mother liquor by use of separate nozzles.

In the reactional precipitation method, the formation speed of a sparingly soluble salt precipitate is extremely high and therefore, when it takes a long time (an average mixing time) to make the mother liquor uniform after the addition of additive solutions, a reaction is caused at a portion where the concentration is localized and precursors having various particle sizes and shapes are formed, as a result, the distribution is broadened.

A rapid mixing is a necessary factor in forming a precursor having a narrow distribution.

In order to realize the distribution of the present invention, specifically, in order for 90% by mass or more of all the particles to have a particle size within ±30% of the average particle size, the average mixing time is preferably not more than 10 sec., more preferably not more than 1 sec. and further more preferably not more than 100 msec.

The particle size is controlled by a supersaturation degree in the mother liquor. The supersaturation degree $\rho$ is determined by a solution concentration C of a solute and a solubility Ce of the solute, and is expressed by the following the equation.

$\rho = (C-Ce)/Ce$

As to the supersaturation degree, for example, as the addition concentration is denser, the amount of mother liquor is smaller and the speed is higher, the supersaturation degree is more increased and the particle size is more reduced. Further, the reaction temperature is also an important factor, and as the temperature of the mother liquor is more lowered, the supersaturation degree is more increased.

Further, as an index indicating the control of the supersaturation degree in the present invention, a supersaturation degree index $\rho k$ is defined. When the solution concentration index Ck is defined as $Ck = \{(\text{Time to cause nucleus generation}) \times (\text{Additional liquid concentration}) \times (\text{Addition amount per unit time})\}/(\text{Amount of mother liquor})$, the supersaturation degree index $\rho k$ is expressed by the following equation:

$\rho k = (Ck-Ce)/Ce$

Here, the term "time to cause nucleus generation" is defined as time from the start of the addition and the measurement of a transmission density of the mother liquor by using MCPD-3000 manufactured by Ohtsuka Electric, to the change of the concentration. Further, although the unit of Ck(solution concentration index) is concentration, the supersaturation degree index $\rho k$ is dimensionless. The time, the volume and the concentration are the same value even though any unit is used.

In order to realize the particle size of the present invention, specifically, in order to obtain an average particle size of from 10 nm to 2 μm, the supersaturation degree index is preferably from 0.2 to 50 more preferably from 10 to 50.

The addition concentration, the amount of the mother liquor and the addition time are determined according to the production scale and can be controlled so as to meet the supersaturation degree index and so that the average mixing time is within the range.

The temperature may be from the melting point of the solvent to the boiling point thereof. The temperature can be suitably selected within this range.

Use of the protective colloid is a necessary factor to form a spherical particle. The protective colloid plays a roll in adsorbing on a surface of the particle to uniformly grow the surface.

On the other hand, when the protective colloid is not sufficiently used, the amount of adsorption among particles is made uneven and a difference is caused in the growth speed among particles, which results in a broad distribution, and therefore, it is necessary to take account of the amount of protective colloid.

In order to realize the shape of the present invention, specifically, in order for the ratio of particles having no corners to all the particles to be 80% or more in number, the amount of protective colloid is preferably from 2.5% to 15%, more preferably from 4% to 7%.

As described above, after synthesizing precursors by the liquid phase process, if desired, the precursors are recovered by a method such as filtration, evaporation to dryness and centrifugal separation and then, preferably subjected to washing and desalting process.

The desalting process is a process for removing impurities such as ions which remain in the solution regardless of the reactions, from the phosphor precursors, and various methods such as a membrane separation method, a coagulation process, an electrodialysis method, a method of using an ion exchange resin and a noodle washing method can be applied.

In the present invention, electric conductivity after the desalting of precursors is preferably from 0.01 mS/cm to 20 mS/cm, more preferably from 0.01 mS/cm to 10 mS/cm, particularly preferably from 0.01 mS/cm to 5 mS/cm from the viewpoint of improving productivity of phosphor precursors and preventing coarse particles or expansion of particle size distribution by sufficient removal of ions which remain in the solution regardless of the reactions, or impurities.

The adjustment to the electric conductivity as described above is effective also in improving emission luminance of the finally obtained phosphors. The electric conductivity can be measured by any measuring method and a commercially available electric conductivity measuring unit may be used.

After completion of the desalting process, a drying process may be further performed.

Next, the calcination process according to the present invention is described.

The phosphor according to the present invention is obtained by subjecting the phosphor precursor obtained by the above-described phosphor formation process to calcination treatment.

Any method may be used at the calcinaton of the phosphor precursor. The calcination temperature and the calcination time may be adjusted to optimize the performance. For example, when the phosphor precursor is calcined between 600° C. and 1800° C. for a reasonable time in air, a phosphor having an objective composition can be obtained. In addition, there is also an effective method of performing calcination at about 800° C. to oxidize an organic matter and then, performing calcination at 1100° C. for 90 minutes in air.

As for a calcination apparatus (calcination vessel), any currently known apparatus can be used. For example, a box furnace, a skull crucible furnace, a cylindrical metal pipe, a heating boat, a rotary kiln, etc. are preferably used. As for an atmosphere, an oxidation gas, a reducing gas, an inactive gas, etc. can be used according to the composition of the precursor, and any atmosphere can be appropriately selected. Further, the reduction treatment or the oxidation treatment may be applied after the calcination, if desired.

Further, a sintering inhibitor may be added during the calcination, if desired. In the case of adding the sintering inhibitor, it can be added as a slurry at the formation of phosphor precursors. In addition, a powdery sintering inhibitor may be mixed with a dried precursor prior to the calcination.

The sintering inhibitor is not particularly limited, and is suitably selected depending on phosphor types or calcination conditions. For example, depending on the calcination temperature area of the phosphor, a metal oxide such as $TiO_2$, a metal oxide such as $SiO_2$ and a metal oxide such as $Al_2O_3$ may be preferably used for the calcination at 800° C. or less, for the calcination at 1000° C. or less and for the calcination at 1700° C. or less, respectively.

Depending on phosphor compositions or reaction conditions, for example, the crystallization proceeds in the drying step, etc. and therefore, it is not necessarily to perform calcination in some cases. In this case, the calcination step may be omitted.

After the calcination step, various steps such as a cooling step and a surface treatment step may be performed or classification may be performed.

In the cooling step, a treatment for cooling a calcined product obtained in the calcination step is performed. The cooling treatment method is not particularly limited, and is suitably selected from publicly known cooling methods. For example, the calcined product can be cooled while filling it in the calcination apparatus. Further, the temperature may be lowered by leaving the calcined product alone or may be forcibly lowered while controlling the temperature using a cooler.

The phosphor produced in the present invention can be subjected to surface treatment such as adsorption and coating for a variety of purposes. Timing for subjecting the phosphor to the surface treatment varies depending on the object, and the effect is remarkably exerted by appropriately selecting the timing. In order to improve dispersibility of the phosphor, the surface treatment is preferably performed, for example, at the time of preparing the phosphor paste according to the present invention as described later. Thus, the phosphor can be produced.

Figure 1:
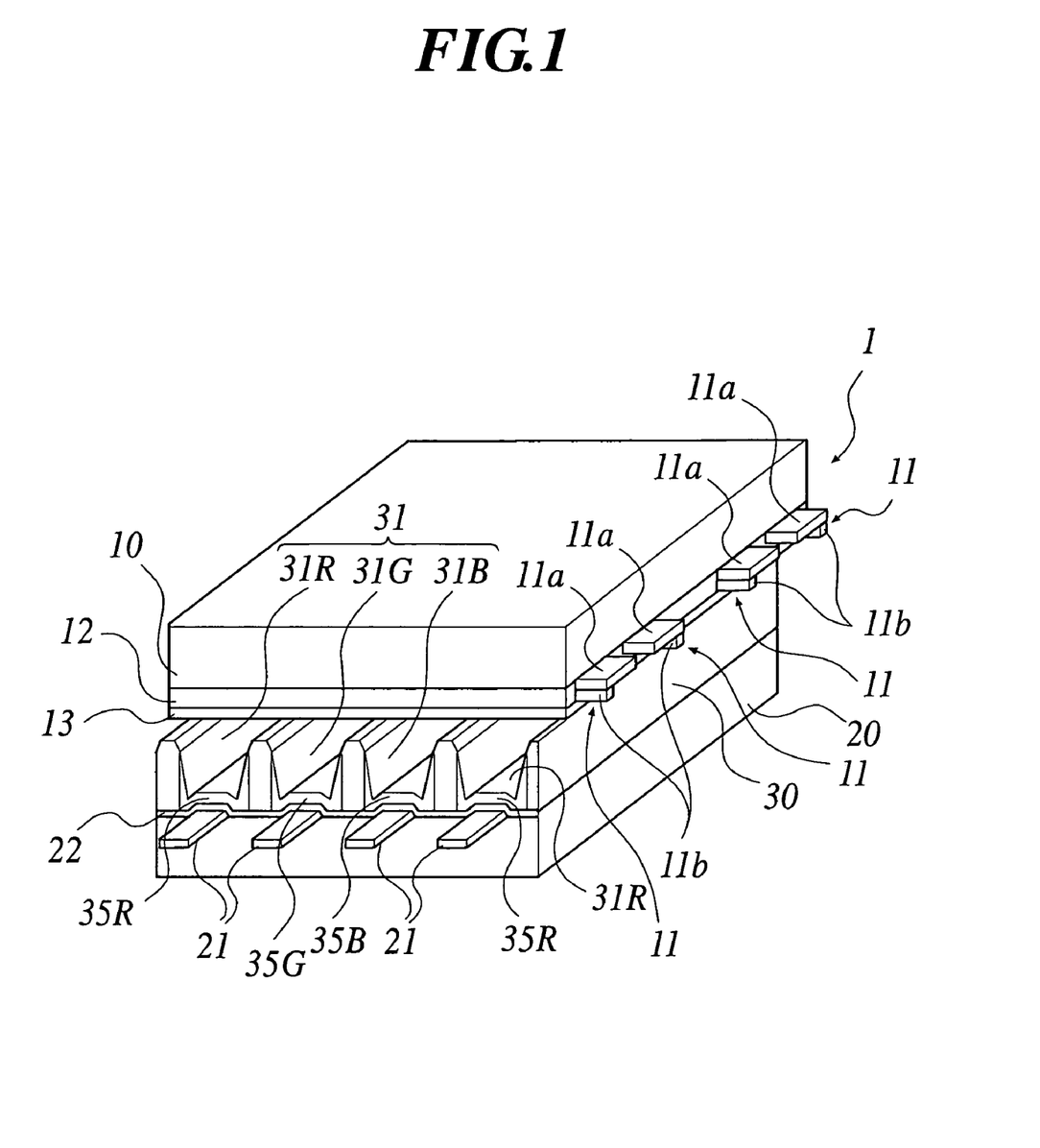
FIG. 1 is a perspective view showing one example of the plasma display panel according to the present invention.

Next, the plasma display panel according tot he present invention is described by referring to FIG. 1. The PDPs are roughly classified into a DC type of applying a direct current voltage and an AC type of applying an alternating current voltage in view of the electrode structure and the operation mode. FIG. 1 shows one example of the schematic construction of the AC type PDP.

Figure 2:
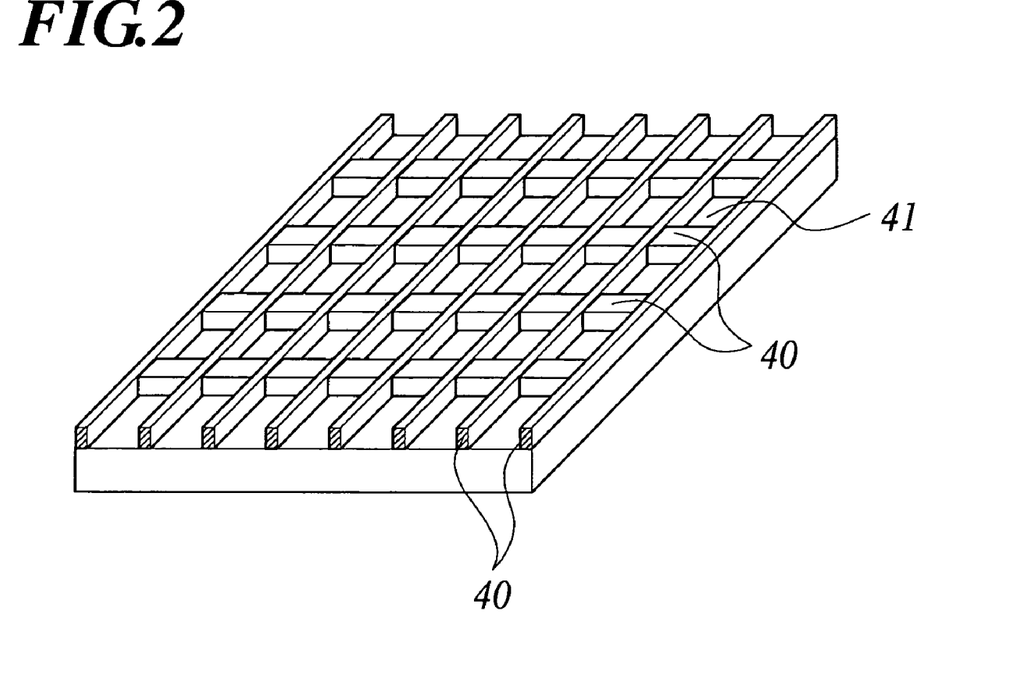
FIG. 2 is a substantial part perspective view showing one example of the structure of the discharge cell.
Figure 3:
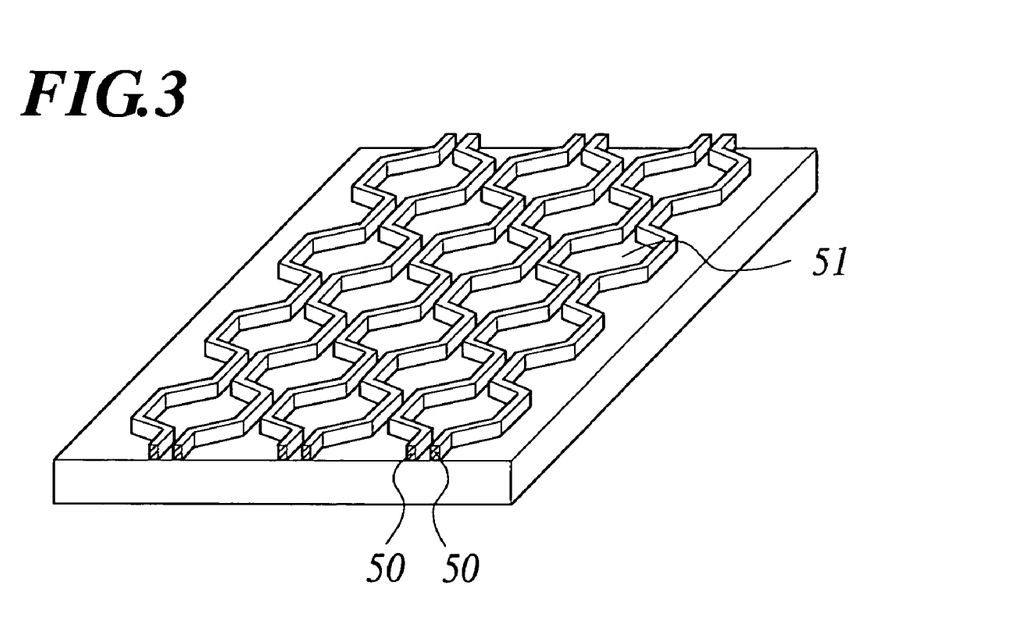
FIG. 3 is a substantial part perspective view showing one example of the structure of the discharge cell.

The PDP 1 as shown in FIG. 1 comprises two sheets of substrates 10 and 20 having provided thereon electrodes 11 and 21, partition walls 30 provided between these substrates 10 and 20, and a plurality of minute discharge spaces (hereinafter referred to as a discharge cell) 31 partitioned by these partition walls 30 into a predetermined shape. The discharge cell 31 shown in FIG. 1 is a so-called stripe type, in which when the substrates 10 and 20 are disposed horizontally, the partition walls 30 are provided at every predetermined distance in parallel to each other (that is, in the form stripe). The structure of the discharge cell is not limited to this stripe type one, and there may be used a lattice type discharge cell 41 constructed by providing partition walls 40 in the form of a lattice, when two-dimensionally viewed, as shown in FIG. 2, or a honeycomb-form (octagonal-form) discharge cell 51 constructed by providing a pair of twisted partition walls 50 symmetrical to each other as shown in FIG. 3.

In each of discharge cells 31R, 31G and 31B, phosphor layers 35R, 35G and 35B composed of phosphors emitting any one of red (R), green (G) and blue (B) light are provided, respectively.

Within each of the discharge cells 31, a discharge gas is enclosed and at least one of points where the electrodes 11 and 21 intercross when two-dimensionally viewed is provided. In the PDP1 according to the present invention, the phosphor layers 35R, 35G and 35B are produced using the phosphor according to the present invention.

Each construction element of the PDP1 is described below.

First, out of two sheets of the substrates, a construction of a front substrate 10 side disposed at a display side is described. The front substrate 10 transmits a visible light emitted from the discharge cell 31, performs various information displays on the substrate and functions as the display screen of the PDP1.

As the front substrate 10, a material such as soda lime glass (blue plate glass) transmitting a visible light can be preferably used. A thickness of the front substrate 10 is preferably from 1 to 8 mm, more preferably 2 mm.

On the front substrate 10, a display electrode 11, a dielectric layer 12, a protective layer 13, etc. are provided.

A plurality of the display electrodes 11 are provided on an opposing surface of the front substrate 10 to the rear substrate 20, and are regularly disposed. The display electrode 11 has a transparent electrode 11$a$ and a bus electrode 11$b$, and has a structure where on the broad transparent electrodes 11$a$ formed in the form of a strip, the bus electrodes 11$b$ similarly formed in the form of a strip are stacked. The bus electrode 11$a$ is formed to have a narrower width than that of the transparent electrode 11$a$. The display electrodes 11 are orthogonal to the above-described partition walls 30, when two-dimensionally viewed. A pair of the display electrodes 11 are composed of two display electrodes which are disposed to oppose each other with a predetermined discharge gap.

As the transparent electrode 11$a$, a transparent electrode such as a nesa film, etc. can be used, and a sheet resistance thereof is preferably 100 Ω or less. A width of the transparent electrode 11$a$ is preferably from 10 to 200 μm.

The bus electrode 11$b$ is an electrode for lowering a resistance, and can be formed by a sputtering method of Cr/Cu/Cr. A width of the bus electrode 11$b$ is preferably from 5 to 50 μm.

The dielectric layer 12 covers the entire surface of the front substrate 10 where the display electrode 11 is disposed. The dielectric layer 12 can be formed from a dielectric substance such as a low-melting point glass. A thickness of the dielectric layer 12 is preferably from 20 to 30 μm.

The entire surface of the dielectric layer 12 is covered with the protective layer 13. As the protective layer 13, a MgO film can be used. A thickness of the protective layer 13 is preferably from 0.5 to 50 μm.

Next, among two sheets of the substrates 10 and 20, a construction of the other rear substrate 20 side is described. On the rear substrate 20, an address electrode 21, a dielectric layer 22, a partition wall 30, phosphor layers 35R, 35G and 35B, etc. are provided.

As the rear substrate 20, soda lime glass (blue plate glass) etc. can be used similarly to the front substrate 10. A thickness of the rear substrate 20 is preferably from 1 to 8 mm, more preferably about 2 mm.

A plurality of the address electrodes 21 are provided on an opposing surface of the rear substrate 20 to the front substrate 10. The address electrodes 21 are also formed in the form of a strip similarly to the transparent electrodes 11a or the bus electrodes 11b. A plurality of the address electrodes 21 are provided at every predetermined distance so as to be orthogonal to the above-described display electrodes 11, when two-dimensionally viewed.

As the address electrode 21, a metal electrode such as an Ag thick-film electrode can be used. A width of the address electrode 21 is preferably from 100 to 200 µm.

When performing a display, a trigger discharge is selectively carried out between the address electrode 21 and any one of a pair of the display electrodes 11 and 11 to thereby select a discharge cell of performing a display. Thereafter, a sustaining discharge between the pair of display electrodes 11 and 11 is carried out within the selected discharge cell, whereby an ultraviolet ray ascribable to the discharge gas is generated to allow a visible light to generate from the phosphor layers 35R, 35G and 35B.

The dielectric layer 22 covers the entire surface of the rear substrate 20 where the address electrode 21 is disposed. The dielectric layer 22 can be formed from a dielectric substance such as a low-melting point glass. A thickness of the dielectric layer 22 is preferably from 20 to 30 µm.

On the above-described dielectric layer 22, the partition walls 30 are provided so as to protrude from the rear substrate 20 side to the front substrate 10 side. The partition walls 30 are formed lengthily in the longitudinal direction and provided at both sides of the address electrode 21 so as to form the discharge cells 31 in the form of a stripe when two-dimensionally viewed, as described above.

The partition walls 30 can be formed from a dielectric substance such as a low-melting point glass. A width of the partition walls 30 is preferably from 10 to 500 m, more preferably about 100 µm. A height (thickness) of the partition walls 30 is usually from 10 to 100 µm, preferably about 50 µm.

In each of the discharge cells 31, any one of the phosphor layers 35R, 35G and 35B emitting each light color as described above is provided in regular order. A thickness of respective phosphor layers 35R, 35G and 35B is not particularly limited, however, it is preferably from 5 to 50 µm.

At the formation of the phosphor layers 35R, 35G and 35B, the phosphor produced above is dispersed in a mixture of binder, solvent, dispersant, etc., and the resulting phosphor paste adjusted to a suitable viscosity is coated on or filled in the discharge cells 31, followed by drying or by baking to form the phosphor layers 35R, 35G and 35B where the phosphor is adhered to a side surface 30a of the partition walls and a bottom surface 30a of the cells.

First, the adjustment of the phosphor paste is described.

The phosphor paste is one obtained by dispersing the phosphor in a mixture of binder, solvent, dispersant, etc. and adjusting the viscosity to a suitable one. The content of the phosphor in the phosphor paste is preferably from 30% by mass to 60% by mass.

By changing a ratio of the phosphor to non-volatile components in the phosphor paste, a filling factor of the phosphor in the phosphor layer can be controlled. Incidentally, the non-volatile components said herein are the other components excluding the phosphor and the solvent from the phosphor paste.

At the preparation of the phosphor paste, in order to improve dispersibility of the phosphor particles among the paste, the phosphor particles are preferably subjected to surface treatment such as adherence or coating of oxides, organic high molecular compounds and fluorides. When subjecting the phosphor particles to the surface treatment, a thickness or coverage of a covering layer can be arbitrarily controlled appropriately.

The oxides include one containing at least one element selected from Si, Ti, Al, Zr, Zn, In and Sn. The fluorides include magnesium fluoride ($MgF_2$) and aluminum fluoride ($AlF_3$).

When the surface of the phosphor is covered with oxides or fluorides, reduction in crystallinity of the phosphor at the dispersion treatment can be suppressed, and exited energy is prevented from being trapped in surface defects of the phosphor, so that reduction in emission luminance and emission intensity can be suppressed.

On the other hand, when the surface of the phosphor is covered with organic high molecular compounds, properties such as weather resistance are improved, so that a phosphor having excellent durability can be obtained.

Next, a binder, a solvent, a dispersant, etc. which are mixed with the phosphor at the preparation of the phosphor paste are described.

As the binder suitable for preferably dispersing the phosphor particles, ethyl cellulose or polyethylene oxide (a polymer of ethylene oxide) is given, and particularly preferred is ethyl cellulose having the content of an ethoxy group ($-OC_2H_5$) of from 49 to 54%. Further, a photosensitive resin can be used as the binder. The content of the binder is preferably from 0.15% by mass to 10% by mass. Incidentally, in order to adjust the shape of the phosphor paste coated between the partition walls 30, the content of the binder is preferably set to a little extra amount within the range where the paste viscosity is not excessively high.

As the solvent, a mixture of organic solvents having a hydroxide group (OH group) is preferably used. Specific examples of the organic solvents include terpineol ($C_{10}H_{18}O$), butyl carbitol acetate, pentanediol (2,2,4-trimethyl pentanediol monoisobutylate), dipentene (otherwise known as "Limonene"); and butyl carbitol. A mixed solvent including these organic solvents have superior ability to dissolve the binder given above, as well as achieving superior dispersibility of phosphor paste.

In order to improve dispersion stability of the phosphor particles among the phosphor paste, a surfactant is preferably added as a dispersant. The content of the surfactant within the phosphor paste is preferably from 0.05% by mass to 0.3% by mass in terms of improvement effects of the dispersion stability or effectively obtaining a charge-removing effect, etc. as described later.

Specific examples of the surfactants which can be used include (a) an anionic surfactant, (b) a cationic surfactant and (c) a nonionic surfactant, and specific examples of each surfactant include the following ones.

(a) Examples of the anionic surfactant include salts of fatty acids, alkyl sulfate, ester salts, alkyl benzene sulfonate, alkyl sulfosuccinic acid salt, naphthalene sulfonic acid polycarbonic acid polymer.

(b) Examples of the cationic surfactant include alkyl amine salt, quarternary ammonium salt, alkyl betaine, and amine oxide.
(c) Examples of the nonionic surfactant include polyoxy ethylene alkyl ether, polyoxy ethylene derivatives, sorbitan fatty ester, glycerol fatty acid ester, and polyoxy ethylene alkylamine.

Further, it is preferable to add a charge-removing material to the phosphor paste. The surfactants given above generally have a charge-removing action for preventing charge of the phosphor paste, and a number of surfactants correspond to the charge-removing material. However, the charge-removing action varies depending on the kind of phosphor, binder and solvent and therefore, it is preferable to test various kinds of surfactants and select surfactants having excellent results.

As the charge-removing materials, fine particles composed of electroconductive materials can also be given in addition to the surfactants. Specific examples of the electroconductive fine particles include fine particles of carbon such as carbon black, fine particles of graphite, fine particles of a metal such as Al, Fe, Mg, Si, Cu, Sn and Ag, or fine particles comprising an oxide of these metals. It is preferable to add 0.05 to 1.0% by mass of these electroconductive fine particles to the phosphor paste.

The addition of a charge-removing material into the phosphor paste prevents a faulty formation of the phosphor layers 35R, 35G and 35B such as a buildup of the phosphor layers 35R, 35G and 35B at a discontinuity of the address electrode in the panel central portion or occurrence of a slight dispersion in the amount of the phosphor paste coated within the discharge cells 31R, 31G and 31B or in an adhered state of the phosphor paste to grooves within the discharge cells due to charging of the phosphor paste, so that uniform phosphor layers 35R, 35G and 35B can be formed within respective discharge cells 31R, 31G and 31B.

When using a surfactant or carbon fine powder as a charge-removing material as described above, in the baking step for removing a solvent or binder contained in the phosphor paste, the charge-removing material is also evaporated or burnt and therefore, the charge-removing material does not remain within the phosphor layers 35R, 35G and 35B after the calcination. Accordingly, there is no possibility that driving of the PDP1 (light emitting operation) is affected due to remaining of the charge-removing material within the phosphor layers 35R, 35G and 35B.

When the phosphors are dispersed in the above-described various mixtures, there can be used, for example, a machine for moving media in an apparatus to render the phosphors fine by both of the crush and shearing force of the media, such as a high-speed stirring impeller disperser, colloid mill, roller mill, ball mill, vibration mill, attritor, planetary mill and sand mill; a dry disperser such as cutter mill, hammer mill and jet mill; an ultrasonic disperser; a high pressure homogenizer, etc.

When the phosphor paste prepared as described above is coated on or filled in the discharge cells 31R, 31G and 31B, a variety of methods such as a screen printing method, a photo-registration method and an ink jet process can be used.

In particular, the method for coating the phosphor paste by use of the ink jet process is preferable because the phosphor paste can be easily and uniformly coated or filled between the partition walls 30 with accuracy at a lower cost even when a pitch of the partition walls 30 is narrow and the discharge cells 31R, 31G and 31B are finely formed. In the present invention, since the average particle size of the phosphor particles is from 10 nm to 500 nm, clogging or ejection failure of nozzles and precipitation of phosphor particles are suppressed even using the ink jet process, so that the thin phosphor layers 35R, 35G and 35B can be uniformly formed with high accuracy.

As the ink jet apparatus for use in the present invention, ones described in Japanese Patent Application Publication Tokukaihei-8-281975, Japanese Patent Application Publication Tokukaihei-8-207319, Japanese Patent Application Publication Tokukaihei-5-84909, etc. are given as one example, however, the present invention is not limited thereto.

Figure 4:
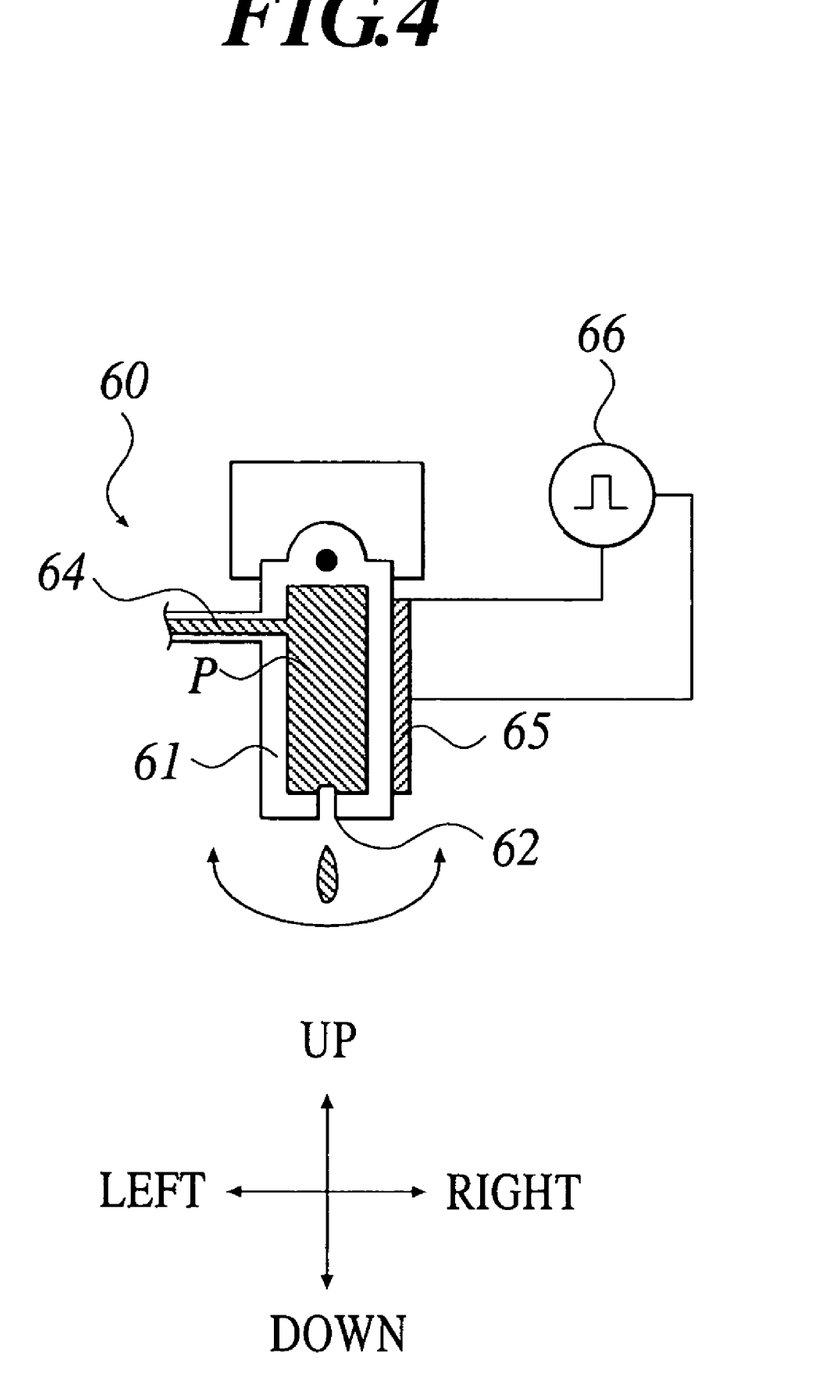
FIG. 4 is a substantial part perspective view showing the structure of the ink jet apparatus.

FIG. 4 is a cross sectional view showing one example of an ink jet apparatus 60. The apparatus roughly comprises a head 61 for storing ink in the inside thereof; an ink jet nozzle 62 for ejecting the drop-like phosphor paste P, which is provided at the lower end of the head 61; a connecting pipe 64 for supplying the phosphor paste P from an ink tank not shown to the head 61; a piezoelectric element 65 attached on a side surface of the head 61; a nozzle drive means (not shown) for moving the ink jet nozzle 62 in the longitudinal and lateral directions, etc.

In addition to the piezoelectric type, an apparatus of a bubble-jet (trade name) type for pushing ink by bubbles or a beam-jet type, etc. can also be used.

When a control means outputs a pattern signal to a pattern signal source 66 connected to the piezoelectric element 65 while moving the head 61 on the discharge cell 31 (discharge cell 41 and discharge cell 51), the phosphor paste P within the head 61 is ejected within the discharge cell, whereby the phosphor layer is formed over almost the entire area of the side surface (side surface of the partition walls) and the bottom surface (surface of the substrate) of the discharge cell.

As described above, the method for intermittently ejecting the phosphor paste within the discharge cells is preferable because, in the case of moving the ink jet nozzle in the longitudinal direction, ejection of the phosphor paste is stopped when the nozzle passes over the partition walls disposed in the lateral direction, for example, as in the lattice-type discharge cell 41 shown in FIG. 2, whereby adherence of the phosphor paste onto the partition walls can be prevented and the phosphor can be accurately and efficiently filled in the discharge cells. On the other hand, the method for intermittently ejecting the phosphor paste is liable to cause clogging of the nozzle. However, when the phosphor paste is prepared using the phosphor according to the present invention, clogging of the nozzle can be prevented, which leads to smooth ejection of the phosphor paste.

EXAMPLES

The present invention is described in greater detail below by referring to Examples 1 to 3, however, the present invention is not limited thereto.

Example 1

In the Example 1, the phosphors 1-1 to 1-6 according to the present invention are produced and evaluated on a particle size, a distribution of the particle size and a ratio of a particle having no corner, with Comparative Examples 1-1 to 1-5.

(1) Production of Phosphor 1-1 ($Zn_2SiO_4:Mn^{2+}$)

1,000 cc of an aqueous 5% low molecular gelatin solution was designated as an "A" solution. 500 cc of a solution prepared by dissolving 35.33 g of zinc nitrate hexahydrate and 1.79 g of manganese nitrate hexahydrate in purified water was designated as a "B" solution. 500 cc of a solution prepared by mixing 18.25 g of an aqueous 28% ammonia solution with purified water was designated as a "C" solution. 200 cc of a solution prepared by mixing 12.52 g of an aqueous 30% colloidal silica 30R25 having the particle size of 20 nm (produced by Clariant (Japan) K.K.) solution with purified water was designated as a "D" solution.

At a room temperature, the "A" solution was violently stirred and thereto, the "B" solution and the "C" solution were added at an equal velocity for 30 minutes, as a result, a white precipitate was generated. Subsequently, the "D" solution was added into the resulting "A" solution for 4 minutes and then, solid-liquid separation was performed by a pressure filtration method. Thereafter, a recovered cake was dried at 100° C. for 24 hours to obtain a dried precursor. The obtained precursor was calcined at 700° C. for 3 hours in air and then, further calcined at 1200° C. for 3 hours in an atmosphere of 100% nitrogen to obtain a green-emitting phosphor 1-1.

(2) Production of Phosphor 1-2 ($BaMgAL_{10}O_{17}:Eu^{2+}$)

A solution prepared by dissolving, in 500 cc of purified water, 22.0 g of barium chloride dihydrate, 20.33 g of magnesium chloride hexahydrate, 421.4 g of aluminum chloride hexahydrate and 3.66 g of europium chloride hexahydrate was designated as an "A" solution. 500 cc of an aqueous 1 mol/L ammonia solution was designated as a "B" solution, and 500 cc of an aqueous 1 mol/L oxalic acid solution was designated as a "C" solution.

While violently stirring, in a beaker, 1000 cc of an aqueous 5% low molecular gelatin solution at 40° C., the solutions A, B and C were added thereto at an equal velocity for 10 minutes and then, solid-liquid separation was performed by a pressure filtration method. Thereafter, a recovered cake was dried at 100° C. for 24 hours to obtain a dried precursor. The obtained precursor was calcined at 700° C. for 3 hours in air and then, further calcined at 1600° C. for 3 hours in a reducing atmosphere to obtain a blue-emitting phosphor 1-2. The supersaturation degree index was 23.

(3) Production of Phosphor 1-3 (($Y, Gd)BO_3:Eu^{3+}$)) 1000 cc of an aqueous 5% low molecular gelatin solution was designated as an "A" solution. A solution prepared by dissolving 0.078 mol of an yttrium nitrate hexahydrate and 0.045 mol of a gadolinium nitrate in 500 cc of water was designated as a "B" solution. A solution prepared by dissolving 0.0065 mol of europium nitrate in 50 cc of water was designated as a "C" solution, and a solution prepared by dissolving 0.123 mol of boric acid in 500 cc of water was designated as a "D" solution The "A" solution was violently stirred at 60° C. and thereinto, the solutions B, C and D kept at 60° C. each was added at an equal velocity for 4 minutes at the same time.

A white precipitate formed in the "A" solution was filtered and dried and then, calcined at 1400° C. for 2 hours in air to obtain a phosphor 1-3.

(4) Production of Phosphor 1-4

The "B" solution to "D" solution were prepared in the same manner as in the phosphor 1-1 except for using 1,000 cc of purified water in place of the "A" solution in the phosphor 1. The "A" solution was violently stirred at 10° C. and thereto, the "B" solution and the "D" solution were added at an equal velocity for 30 minutes. After the completion of addition, the "C" solution was added at an equal velocity for 60 minutes and then, solid-liquid separation was performed by a pressure filtration method. Thereafter, a recovered cake was dried at 1000° C. for 24 hours to obtain a dried precursor. The obtained precursor was calcined at 1200° C. for 3 hours in an atmosphere of 100% nitrogen to obtain a green-emitting phosphor 1-4.

(5) Production of Phosphor 1-5

1000 cc of an aqueous 5% low molecular gelatin solution was designated as an "A" solution. 500 cc of a solution prepared by dissolving, in purified water, 141.78 g of zinc nitrate hexahydrate and 7.18 g of manganese nitrate hexahydrate was designated as a "B" solution. 500 cc of a solution prepared by mixing 72.99 g of an aqueous 28% ammonia solution with purified water was designated as a "C" solution. 200 cc of a solution prepared by mixing 50.07 g of an aqueous 30% colloidal silica 30R25 having the particle size of 20 nm (produced by Clariant (Japan) K.K.) solution with purified water was designated as a "D" solution.

The "A" solution was kept at 60° C., violently stirred and thereinto, the "B" solution and the "C" solution were added at an equal velocity for 100 minutes, as a result, white precipitation was generated. Subsequently, the "D" solution was added into the resulting "A" solution for 4 minutes and then, solid-liquid separation was performed by a pressure filtration method. Thereafter, a recovered cake was dried at 100° C. for 24 hours to obtain a dried precursor. The obtained precursor was calcined at 700° C. for 3 hours in air and then, further calcined at 1200° C. for 3 hours in an atmosphere of 100% nitrogen to obtain phosphor 1-5. The supersaturation degree index was 6.14.

(6) Production of Phosphor 1-6

Phosphor 1-6 was obtained in the same manner as in the phosphor 1-5 except for using 5000 cc of the "A" solution in the phosphor 1-5. The supersaturation degree index was 0.42.

Comparative Example 1

In order to compare with Example 1, green-emitting phosphors ($Zn_2SiO_4:Mn^{2+}$) were produced as Comparative Example.

(1) Production of Comparative Example 1-1

Comparative Example 1-1 was obtained in the same manner as in the phosphor 1-1 except for using 1,000 cc of purified water in place of the "A" solution in the phosphor 1.

(2) Production of Comparative Example 1-2

Comparative Example 1-2 was obtained in the same manner as in the phosphor 1-1 except for using an aqueous 1% low molecular gelatin solution in place of the "A" solution in the phosphor 1.

(3) Production of Comparative Example 1-3

Comparative Example 1-3 was obtained in the same manner as in the phosphor 1-6 except for changing the temperature of the "A" solution in the phosphor 1-6 to a temperature of 80° C. The supersaturation degree index was 0.11.

(4) Production of Comparative Example 1-4

The "B" solution to "D" solution were prepared in the same manner as in the phosphor 1-5 except for using 5,000 cc of purified water in place of the "A" solution in the phosphor 1-5. The "A" solution was violently stirred at 60°

C. and thereto, the "B" solution and the "C" solution were added at an equal velocity for 100 minutes. After the completion of addition, the "D" solution was added to the "A" solution for 4 minutes and continuously stirred for 60 minutes. Then, solid-liquid separation was performed by a pressure filtration method. Thereafter, a recovered cake was dried at 1000° C. for 24 hours to obtain a dried precursor. The obtained precursor was calcined at 1200° C. for 3 hours in an atmosphere of 100% nitrogen to obtain a green-emitting Comparative Example 1-4.

(5) Production of Comparative Example 1-5

Comparative Example 1-5 was obtained in the same manner as in the phosphor 1-6 except for using an aqueous 1% low molecular gelatin solution in place of the "A" solution in the phosphor 1-6.

Table 1 collectively shows the precursor formation conditions for obtained phosphors 1-1, 1-4 to 1-6 and Comparative Examples 1-1 to 1-5.

The average mixing time of the apparatus used in the Examples is 2 sec in case of 1L, and 5 sec in case of 5L.

TABLE 1

| PHOSPHOR | PROTECTIVE COLLOID | "A" SOLUTION | CONCENTRATION OF "B", "C" SOLUTION | ADDITION SPEED | TEMPERATURE |
|---|---|---|---|---|---|
| Phosphor 1-1 | 5% | 1000 cc | 1 | 30 min | R.T |
| Comparative Example 1-1 | not used | 1000 cc | 1 | 30 min | R.T |
| Comparative Example 1-2 | 1% | 1000 cc | 1 | 30 min | R.T |
| Phosphor 1-4 | not used | Order of addition of "B", "C" and "D" solution is different. | | | |
| Phosphor 1-5 | 5% | 1000 cc | 4 | 100 min | 60° C. |
| Phosphor 1-6 | 5% | 5000 cc | 4 | 100 min | 60° C. |
| Comparative Example 1-3 | 5% | 5000 cc | 4 | 100 min | 80° C. |
| Comparative Example 1-4 | not used | 5000 cc | 4 | 100 min | 60° C. |
| Comparative Example 1-5 | 1% | 5000 cc | 4 | 100 min | 60° C. |

Note:
The concentration of B and C solutions was represented by a relative value when the concentration of B and C solutions for the formulation of the phosphor 1-1 was set at 1.

[Evaluation 1]

(1) Average particle size, particle size distribution and observation of shape

The phosphors 1-1 to 1-6 obtained above and the phosphors in Comparative Examples 1-1 to 1-5 were measured on the average particle size and the particle size distribution using a scanning electron microscope, and moreover, the phosphors were observed on the shape. The measurement results and the observation results are shown in Table 2.

The particle size distribution used herein means that 90% by mass of all the particles falls within how many percentages of the average particle size. The ratio of particles having no corners means the percentage in number of particles having no corners to all the particles.

TABLE 2

| PHOSPHOR | AVERAGE PARTICLE SIZE | DISTRIBUTION | | RATIO OF PARTICLES HAVING NO CORNERS | |
|---|---|---|---|---|---|
| Phosphor 1-1 | 432 nm | ⊚ | 15% | ○ | 91% | ○ |
| Phosphor 1-2 | 362 nm | ⊚ | 28% | ○ | 93% | ○ |
| Phosphor 1-3 | 381 nm | ⊚ | 21% | ○ | 94% | ○ |
| Comparative Example 1-1 | 469 nm | ⊚ | 28% | ○ | 21% | X |
| Comparative Example 1-2 | 385 nm | ⊚ | 46% | X | 82% | ○ |
| Phosphor 1-4 | 315 nm | ⊚ | 13% | ○ | 95% | ○ |
| Phosphor 1-5 | 669 nm | ○ | 30% | ○ | 87% | ○ |
| Phosphor 1-6 | 1.68 μm | ○ | 29% | ○ | 84% | ○ |
| Comparative Example 1-3 | 2.14 μm | X | 27% | ○ | 83% | ○ |
| Comparative Example 1-4 | 1.45 μm | ○ | 15% | ○ | 75% | X |
| Comparative Example 1-5 | 1.53 μm | ○ | 48% | X | 87% | ○ |

(2) Evaluation of Emission Intensity

Next, the phosphors 1-1 and the phosphors 1-4 to 1-6, and Comparative Examples 1-1 to 1-5 each was irradiated with ultraviolet rays using an excimer 146 nm lamp (manufactured by Ushio Inc.) within a vacuum chamber of 0.1 to 1.5 Pa, to obtain green light from the phosphors. The intensities of the green light each was measured using a detector (MCPD-3000, manufactured by Ootsuka Denshi Co., Ltd.). Then, the emissionpeak intensities of each phosphor were determined by a relative value when the emission peak intensity of the phosphor 1-1 was set at 100. The results thereof are shown in Table 3.

TABLE 3

| PHOSPHOR | EMISSION INTENSITY |
|---|---|
| Phosphor 1-1 | 100 |
| Comparative Example 1-1 | 92 |
| Comparative Example 1-2 | 93 |
| Phosphor 1-4 | 101 |
| Phosphor 1-5 | 99 |
| Phosphor 1-6 | 102 |
| Comparative Example 1-3 | 95 |
| Comparative Example 1-4 | 88 |
| Comparative Example 1-5 | 89 |

As can be understood from Table 3, the emission intensities of Comparative Examples 1-1 to 1-5 each was low as compared with the phosphors 1-1 and the phosphors 1-4 to 1-6 according to the present invention. From the results, it is found that when the particle size, the shape and the distribution do not fall within the present invention, the emission intensities are lowered.

Example 2

Next, phosphor pastes were prepared using the phosphors 1-1 to 1-6 obtained in the Example 1.

(1) Preparation of Phosphor Paste 2-1

First, a phosphor suspension was prepared by the following composition using the phosphor 1-1 and stirred with a stirrer to obtain a green-emitting phosphor composition.
Phosphor 1-1 45% by mass
a mixed solution containing terpineol and pentanediol in a mixing ratio of 1:1 54 5.5% by mass
ethyl cellulose (content of an ethoxy group: 50%) 0.3% by mass
polyoxyethylenealkyl ether 0.2% by mass Next, the composition was subjected to a preliminary dispersion treatment under the following conditions using a homogenizer manufactured by IKA JAPAN K.K.

(Preliminary Dispersion Conditions)
Blade diameter: 20 mm
Number of rotations: 8000 rpm
Preliminary dispersion time: 2 minutes Subsequently, the composition was subjected to regular dispersion treatment under the following dispersion conditions using a horizontal continuous media-type disperser DISPERMAT SL-C5 (manufactured by VMA-GETZMANN K.K.) to obtain a phosphor paste 2-1.

(Dispersion Conditions)
Number of rotations of disk: 5,520 rpm
Type of beads: zirconia
Diameter of beads: 0.3 mm
Filling factor of beads: 70%
Flow rate: 120 ml/min
Dispersion time: 3 min (2) Preparation of Phosphor Pastes 2-2 to 2-6

Phosphor pastes 2-2 to 2-6 were prepared in the same manner as in the above (1) except for changing the phosphor 1-1 to the phosphors 1-2 to 1-6.

Comparative Example 2

Phosphor pastes in Comparative Examples 2-1 to 2-5 were prepared in the same manner as in the (1) of the Example 2 except for changing the phosphor 1-1 to the phosphor in Comparative Examples 1-1 to 1-5 obtained in Comparative Example 1.

[Evaluation 2]

(1) Heat treatment resistance of phosphor paste (Baking resistance)

The phosphor pastes 2-1, the phosphors 2-4 to 2-6 and the phosphor pastes prepared in Comparative Examples 2-1 to 2-5 each was baked at 500° C. to evaporate a resin portion and then, measured on the emission intensity. The measurement of the emission intensity was performed in accordance with (2) of [Evaluation 1]. The emission intensity was determined by setting the emission intensity of each phosphor before the baking at 100. The results are shown in Table 4.

TABLE 4

|  | PASTE BAKE RESISTANCE (EMISSION INTENSITY) |
| --- | --- |
| Phosphor Paste 2-1 | 96 |
| Comparative Example 2-1 | 74 |
| Comparative Example 2-2 | 73 |
| Phosphor Paste 2-4 | 95 |
| Phosphor Paste 2-5 | 98 |
| Phosphor Paste 2-6 | 99 |
| Comparative Example 2-3 | 88 |
| Comparative Example 2-4 | 76 |
| Comparative Example 2-5 | 75 |

As can be understood from Table 4, in the phosphor pastes 2-1 and 2-4 to 2-6 according to the present invention, the emission intensities before and after the baking step were nearly equivalent and only slight reduction in the emission intensity after the baking step was observed. On the other hand, in Comparative Example 2-5, serious reduction in the emission intensities was observed before and after the baking step, respectively. From the results, it is found that when the shape is changeable or the particle size distribution is broad and small particles are mixed, heat treatment resistance of the phosphor paste is extremely deteriorated.

(2) Ejection of Phosphor Paste

Next, each ejection state at the ejection of phosphor pastes 2-1 to 2-4 and Comparative Examples 2-1 and 2-2 from the ink jet nozzle was observed. Using 10 nozzles, 30 cc of each paste was ejected from each nozzle. Each ejection state was observed. The results are shown in Table 5.

TABLE 5

|  | EJECTION STATE |
| --- | --- |
| Phosphor paste 2-1 | Good |
| Phosphor paste 2-2 | Good |
| Phosphor paste 2-3 | Good |
| Phosphor Paste 2-4 | Good |
| Comparative Example 2-1 | Clogging was caused in 8 nozzles (out of 10 nozzles). |
| Comparative Example 2-2 | Clogging was caused in 2 nozzles (out of 10 nozzles). |

As can be understood from Table 5, in the phosphor pastes 2-1 to 2-4 according to the present invention, the ejection state was good. On the contrary, clogging of the nozzles was caused in Comparative Examples 2-1 and 2-2. From the results, it is found that when the ratio of particles having no corners is reduced or the distribution does not fall within the scope of the present invention, the phosphor pastes are deteriorated in ejection performance.

Example 3

Next, using the phosphor pastes 2-1, 2-5 and 2-6 (green light emitting), the phosphor paste 2-2 (blue light emitting) and the phosphor paste 2-3 (red light emitting) prepared in the above-described manner, an AC surface discharge type PDP 3-1 having a stripe type cell structure shown in FIG. 1 was produced as described later.

(1) Production of PDP 3-1

First, at a predetermined position on a glass substrate used as a front substrate 10, a transparent electrode was disposed as a transparent electrode 11a. Next, by sputtering Cr-Cu-Cr and then performing photoetching, a bus electrode 11b was formed on the transparent electrode 11a and thereby, serving as a display electrode 11. Thereafter, on the surface glass substrate 10, a low melting point glass was printed so as to cover the display electrode 11 and calcined at from 500 to 600° C. to form a dielectric layer 12. Further, on the dielectric layer 12, MgO was deposited by an electron beam deposition method to form a protective film 13.

On the other hand, on a rear substrate 20, an Ag thick film was printed and calcined to form an address electrode 21. Then, partition walls 30 were formed on the rear substrate 20 and at both sides of the address electrode 21. The partition walls 30 could be formed by printing the low melting point glass by a pitch of 0.2 mm and calcining the glass. Further, using a screen coating method, the phosphor paste 1-1, the phosphor paste 1-2 and the phosphor paste 1-3 each was coated within each discharge cell 31 partitioned by the partition walls 30. At this time, one color of the phosphor pastes was used for each discharge cell 31. Thereafter, the phosphor pastes were dried or calcined to remove organic components in the pastes, whereby the phosphor layers 35R, 35G and 35B each having a different emission color were formed in the discharge cells 31R, 31G and 31B, respectively.

Then, the front substrate 10 and the rear substrate 20 each having disposed thereon the electrodes 11, 21, etc. were so positioned that respective electrode-disposed surfaces face each other and in a state where a gap of about 1 mm was held, the circumference thereof was sealed with sealing glass (not shown) Thereafter, the substrates 10 and 20 were hermetically sealed by enclosing therebetween a mixed gas of xenon (Xe) generating ultraviolet rays by discharge and neon (Ne) as a main discharge gas, followed by performing the aging, whereby the PDP was produced and designated as PDP 1-1.

(2) Production of PDPs 3-5 and 3-6

PDPs 3-5 and 3-6 were produced in the same manner as in the (1) by using each of the phosphor pastes 2-5 and 2-6 in place of the phosphor paste 2-1 at the formation of green phosphor layer.

Comparative Example 3

In the same manner as in the (1), Comparative Examples 3-1, 3-2 and 3-3 as PDPs were produced by use of the phosphor pastes prepared in Comparative Examples 2-1 to 2-3 in place of the phosphor paste prepared in Example 2 in the formation of the green phosphor layer.

[Evaluation 3]

PDPs 3-1, 3-5 and 3-6 produced above and PDPs in Comparative Examples 3-1 to 3-3 each was measured on the emission intensity. The measurement was performed in accordance with (2) of [Evaluation 1]. Relative emission intensities are shown in Table 6 when the emission intensity of PDP 3-1 is set at 100.

TABLE 6

|  | EMISSION INTENSITY |
|---|---|
| PDP 3-1 | 100 |
| Comparative Example 3-1 | 88 |
| Comparative Example 3-2 | 87 |
| PDP 3-5 | 90 |
| PDP 3-6 | 92 |
| Comparative Example 3-3 | 85 |

As is apparent from Table 6, any PDP of Comparative Examples 3-1 to 3-3 is low in the emission intensity as compared with the emission intensities of PDPs 3-1, 3-5 and 3-6 according to the present invention. From the results, it is found that when the distribution and the shape do not fall within the scope of the present invention, luminance of the PDP is lowered. Further, it is understood that when the distribution and the shape fall within the scope of the present invention, the luminance is highest in the PDP using a phosphor having a particle size of 500 nm or less, and the luminance is lowered in the PDP using a phosphor having a particle size in excess of 2 μm.

As described above, in order to attain objects of the present invention, it is necessary that the phosphor has an average particle size of 2 μm or less, the phosphor has such an extremely narrow particle size distribution that 90% by mass or more of the phosphors have a particle size within ±30% of the average particle size and the ratio of particles having no corner to all the particles is 80% or more in number, whereby there can be obtained the effects according to this application such as improvements in the emission intensity of phosphors themselves, the emission intensity of phosphor pastes, the heat treatment resistance in the baking step, the emission intensity of PDPs and the clogging of ink jet nozzles.

In the above, the Examples of the present invention are explained. However, it is needless to say that the present invention is not limited to such Examples, but various modifications are possible in a range within the scope of the present invention.

According to the present invention, there can be provided a phosphor having higher luminance, shorter afterglow, excellent heat treatment resistance and excellent ultraviolet ray resistance; a method for producing the phosphor; a phosphor paste; and a plasma display panel.

The entire disclosure of Japanese Patent Application No. 2003-64646 filed on Mar. 11, 2003 including specification, claims, drawings and summary are incorporated herein by reference in its entirety.

What is claimed is:

1. A phosphor comprising particles having an average particle size of from 10 nm to 2 μm, wherein 90% by mass or more of all of the particles have particle sizes within ±30% of the average particle size and a ratio of particles having no corners to all of the particles is 80% or more in number,
    wherein the phosphor is produced by a precipitation process of synthesizing a precursor of the phosphor by a liquid phase process in the presence of a protective colloid, wherein the amount of the protective colloid is from 2.5% to 15%, and
    wherein the phosphor is $Zn_2SiO_4:Mn^{2+}$.

2. The phosphor of claim 1, wherein the average particle size of the particles is from 10 nm to 500 nm.

3. The phosphor of claim 1, wherein the particle having no corners is a spherical particle or a particle obtained by fusing a plurality of spherical particles.

4. The phosphor of claim 1, wherein the phosphor is formed by using colloidal silica.

5. The phosphor of claim 1, wherein a precursor of the phosphor is spherical.

6. The phosphor of claim 1, wherein said protective colloid is selected from the group consisting of gelatin, albumin, egg albumin, and casein.

7. The phosphor of claim 1 wherein said protective colloid is a protein.

* * * * *